US005837019A

United States Patent [19]

Endres

[11] Patent Number: 5,837,019

[45] Date of Patent: Nov. 17, 1998

[54] DEVICE FOR SEPARATING DUST PARTICLES

[75] Inventor: Wilhelm Endres, Traunstein, Germany

[73] Assignee: Asea Brown Boveri AG, Baden, Switzerland

[21] Appl. No.: 891,786

[22] Filed: Jul. 14, 1997

[30] Foreign Application Priority Data

Aug. 8, 1996 [DE] Germany ........................ 196 32 038.0

[51] Int. Cl.[6] .................................................... B01D 45/12

[52] U.S. Cl. ................................ 55/404; 55/406; 55/407; 55/408

[58] Field of Search ............................. 55/306, 269, 400, 55/401, 402, 403, 404, 405, 406, 407, 408, 409

[56] References Cited

U.S. PATENT DOCUMENTS

| | | | |
|---|---|---|---|
| 1,829,674 | 10/1931 | Rosenlocher | 55/407 |
| 2,129,413 | 9/1938 | Evans | 55/404 |
| 2,288,734 | 7/1942 | Noack | 55/408 |
| 3,058,720 | 10/1962 | Hart et al. | 55/408 |
| 3,066,912 | 12/1962 | Scheper, Jr. | 253/76 |
| 3,720,045 | 3/1973 | Murphy | 55/306 |
| 3,785,128 | 1/1974 | Redemann | 55/406 |
| 4,336,039 | 6/1982 | Sohre | 55/407 |
| 4,422,821 | 12/1983 | Smith | 55/407 |
| 4,441,322 | 4/1984 | Ritzi | 55/406 |
| 4,561,867 | 12/1985 | Charbonnel | 55/409 |
| 4,714,139 | 12/1987 | Lorenz et al. | 55/400 |

FOREIGN PATENT DOCUMENTS

| | | |
|---|---|---|
| 0702129A2 | 3/1996 | European Pat. Off. . |
| 28652 | 5/1964 | Germany . |
| 2106293 | 12/1971 | Germany . |
| 2121069 | 2/1972 | Germany . |
| 2952446 | 7/1980 | Germany . |
| 3036525A1 | 4/1981 | Germany . |
| 3243279C2 | 6/1983 | Germany . |

*Primary Examiner*—Duane S. Smith
*Attorney, Agent, or Firm*—Burns, Doane, Swecker & Mathis, L.L.P.

[57] ABSTRACT

For the purpose of separating dust particles inside a cooling system of a rotor, fitted with moving blades, of a turbomachine, a device is arranged upstream of the moving blades to be cooled and in the region of the rotor outer surface. The device has at least one feed channel through which a coolant flows, and is directed in the radial direction such that the dust particles located in the coolant accumulate on the side accelerating in the direction of rotation of the rotor. These dust particles subsequently pass into a separation chamber operationally connected to the feed channel and in which they are captured in order then to be discharged.

6 Claims, 2 Drawing Sheets

DEVICE FOR SEPARATING DUST PARTICLES

BACKGROUND OF THE INVENTION

1. Field of the Invention

The present invention relates to a separation device for separating dust particles inside the cooling system of a rotor of a turbo-machine which is fitted with moving blades.

2. Discussion of Background

In modern turbo-machines, it is becoming increasingly important to cool units subjected to high thermal loads. It is the cooling of the moving blades and of the rotor of gas turbines which is particularly in mind here. In principle, the maxim applies here that it is necessary in every case to avoid blockage of the cooling channels provided by dust or larger particles. Cooling channels of moving blades have small through-flow cross sections, as a rule, frequently of the order of magnitude of 1 $mm^2$, for which reason special measures are required to avoid blockages. In the case of air cooling, such a measure comprises, for example, extracting air used for cooling at the inner contour of the moving blade channel of the compressor, where the dust concentration is low. Furthermore, provision is made at the ends of the moving blade cooling channels of dust holes with a diameter of 0.7–1 mm, which prevent accumulation of dust or larger particles. If, however, steam or other media are used as coolant, there is a need to take further-reaching measures which are capable of keeping the particles circulating in the circuit away from the moving blades. Steam circuits are frequently full of particles, in particular at the start of operation. However, these steam circuits are permeated thereby later, as well, owing to flaking scale. To combat this, it is customary to use steam screens which, as a rule, have hole diameters of 3–4 mm, for which reason they are particle traps rather than dust screens. Although it is true that during commissioning a fine screen having small holes with a diameter of about 1 mm can be placed in front, it has, however, to be removed again later for hydrodynamic reasons. By way of comparison, in the case of drainage openings which remain open in steam turbines, the hole diameters would have to be enlarged to at least 4 mm in order to be sure that they do not become blocked partially or wholly after a only a short time. Furthermore, it has to be taken into account that the instances of smallest play in the entire circuit are to be found in the guides of the valve stems, which pulsate against sticking. In steam turbines, erosion of the moving blades can constitute a problem. Seen in this light, special measures are required, in particular, for moving blade cooling channels of gas turbines with a diameter of approximately 1 mm. In accordance with the prior art, an attempt is made to prevent circulation of particles in the entire circuit in several stages and at different points. However, the various measures increase the cost of the system not inconsiderably, leaving aside the fact that it is not possible in this way reliably to prevent a blockage caused by dust particles.

SUMMARY OF THE INVENTION

The invention is intended to provide a remedy here. Accordingly, one object of the invention as defined in the claims is, in the case of a device of the type mentioned at the beginning, to provide a novel simple arrangement by means of which blockage of the cooling channels by dust or larger particles is prevented.

This is achieved according to the invention by providing upstream of the inlet into the cooling circuit of the gas turbine, that is to say preferably in the rotor upstream of the moving blades, one or more separators which ensure that the channels provided for cooling purposes cannot be blocked by dust particles. Proposed here as particularly suitable is an inertial separator which utilizes the centrifugal forces in the rotor, and thus provides maximum protection to the moving blades against the dust particles flowing in in the coolant. In order to be able to make optimum use of these centrifugal forces, this separator is integrated in the rotor at a suitable point, it being necessary to ensure that access to this separator for servicing remains simple.

Such a separator passes at most only a fine dust, but this is no longer bad, because depending on the steam pressure this dust is harmless for the cooling, so long as it remains below 0.5–1 $\mu$m, which means it can stay per se in the circuit. However, in order to be sure that the cooling channels of the moving blades do not become blocked, these cooling channels are designed such that the residual dust possibly remaining in the flow can be deflected at the moving blade tip and transported back, for which the speeds and the pressure drops in the system, and thus the drag forces in the deflections and in the return channels of the coolant inside the moving blades are entirely sufficient, there being a need to state at once that the separation of dust particles according to the invention is not restricted exclusively to the moving blades. It goes without saying that the moving blades are not subjected to loading by any sort of dust particles when separation takes place in the framework described.

Advantageous and expedient developments of the achievement of the object according to the invention are defined in the further dependent claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein elements not required for a direct understanding of the invention are omitted and the flow direction of the media is specified by arrows, and in which.

DESCRIPTION OF THE PREFERRED EMBODIMENTS

Figure 1:
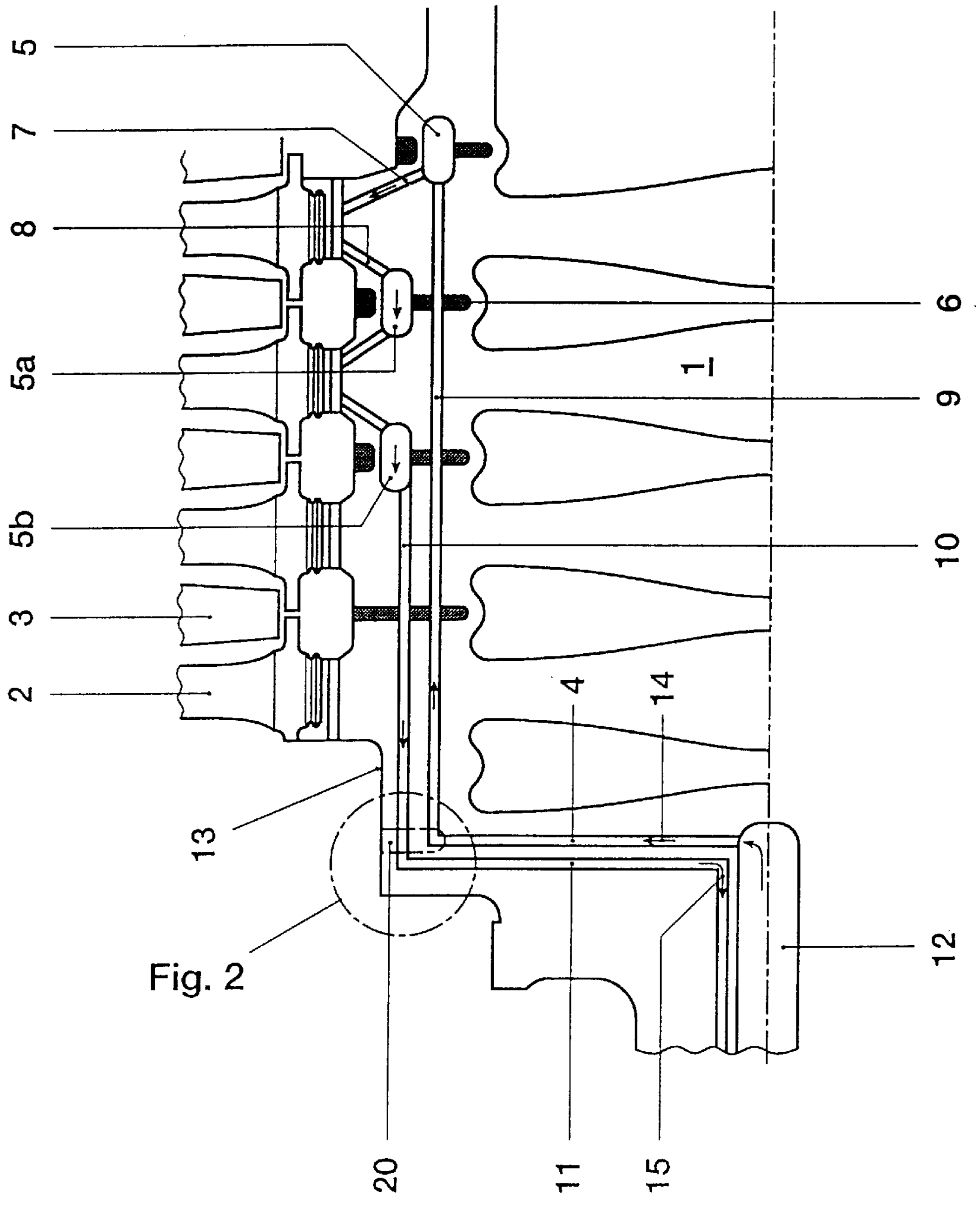
FIG. 1 shows an in-rotor cooling system.

Referring now to the drawings, wherein like reference numerals designate identical or corresponding parts throughout the several views, an in-rotor system such as is normally used is shown in FIG. 1. The rotor 1 fitted with moving blades 2 is designed according to the welding principle, as is to be seen from the welded seams 6. Visible between the moving blades 2 are fixed blades 3 which belong to the stator of just this turbo-machine. A system of channels through which a coolant 14 flows permeates the rotor 1 in such a way that the moving blades 2 can be cooled either in parallel or in series. FIG. 1 shows a series circuit in this connection. Branching from a main coolant cavity 12 is at least one feed channel 4, which firstly leads outwards from the middle of the rotor 1. In the region of the rotor outer surface 13, there is arranged relative to each feed channel 4 a separator 20, of which one is shown here only in a diagrammatic form. Said feed channel 4 leads radially or quasi-radially into the separator 20, and then branches via a further feed channel 9, which extends essentially axially or quasi-axially. This feed channel 9 terminates at the end of the rotor 1, fitted with blades, in a coolant circulating channel 5, from where a first moving blade 2 is cooled via a branch channel 7. The return flow of the coolant 14 used here, which is preferably a steam, from the cooled moving blade 2 is performed via a further branch channel 8 which, for its part, terminates intermediately in a further coolant circulating channel 5*a*, from this point the cooling of the remaining moving blades being performed in accordance with the circuit as shown. Branching in a corresponding number from a last coolant circulating channel 5*b* are axially or quasi-axially extending discharge channels 10 via which the thermally consumed coolant 15 flows back. This discharge channel 10 then merges in the region of the separator 20 into a radially or quasi-radially extending reverse flow channel 11 which conveys the coolant 15 back to a further consumer (not visible), or leads it from the rotor. As may be seen from FIG. 1, the separator 20 is placed in the region of the rotor outer surface 13, as a result of which it is ensured that it can easily be accessed in the simplest way for each service which becomes due. This specific configuration of the separator 20 named here is explained in more detail with reference to FIG. 2.

Figure 2:
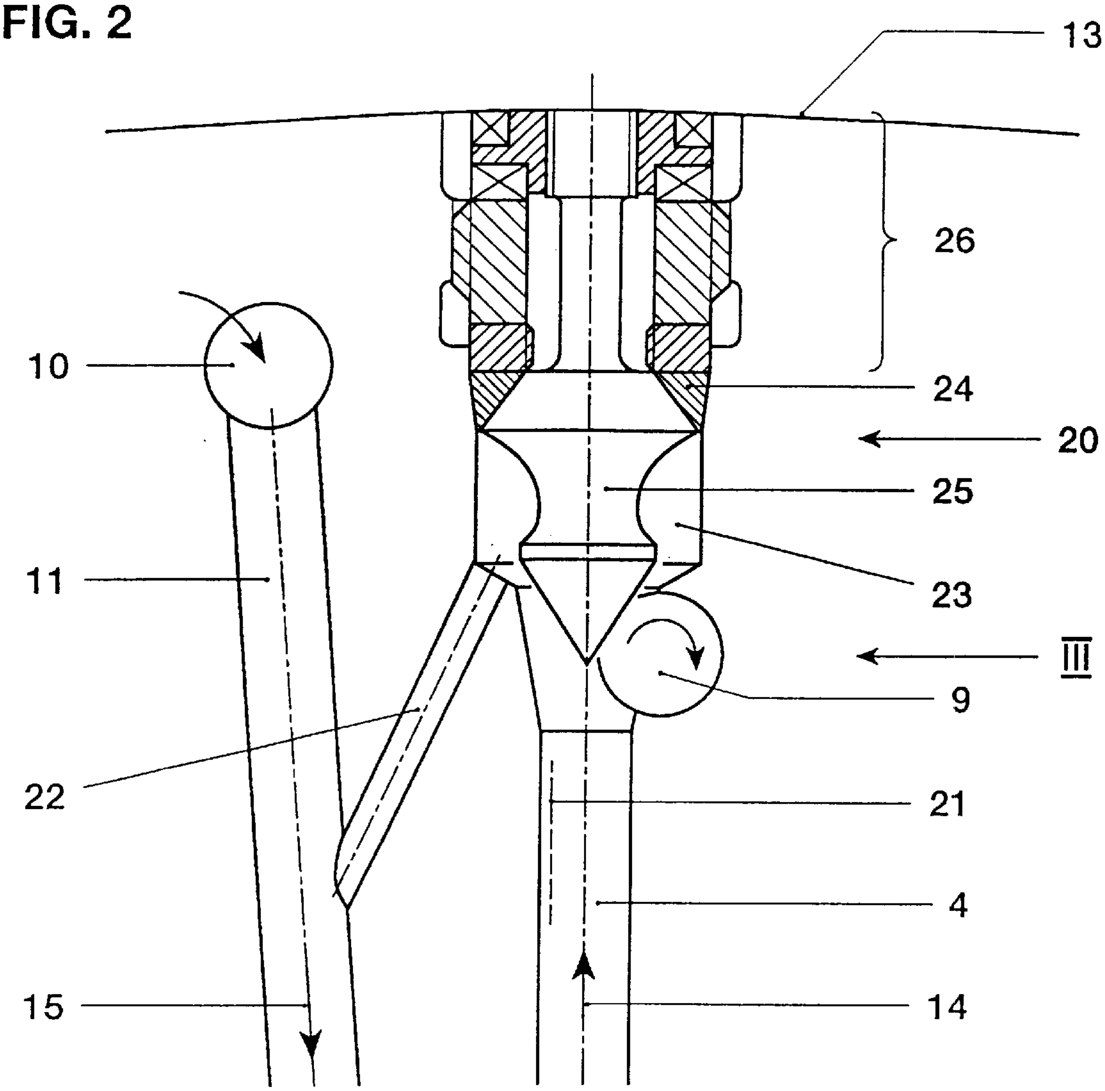
FIGS. 2 and 3 show a design of an inertial separator.

FIG. 2 shows the detailed design of the separator 20, which is arranged at the point named above. The coolant 14 which is conveyed via the feed channel 4 and is permeated by dust particles 21 is to be seen in FIG. 2. The separator 20 is fitted at the end of this feed channel 4, said coolant 14 then being led to the moving blades 2 via the feed channel 9, likewise already mentioned. In the feed channel 4, the turbine-specific centrifugal and drag forces acting on the dust particles 21 are directed outwards. The Coriolis forces consequently concentrate the dust particles 21 on the side accelerating in the direction of rotation of the rotor 1, as is shown in FIG. 2. The separator 20 shown here is thus, in accordance with its function, an inertial separator, the result being to maximize the separation of the dust particles 21. In the radial continuation of the coolant flow, the separator 20 has a separation chamber 23 which is designed as a trap for capturing at least the larger dust particles. The finer and smaller dust particles, which, by virtue of their mass, do not remain suspended in the separation chamber 23, are discharged, via an emptying channel 22 branching from the separation chamber 23, into the reverse flow channel 11, from where they are entrained by the flow of the coolant 15 and led off. For this purpose, the speed and the pressure drop of the coolant 15 must have appropriate values. This leads to the finding that the separator 20 and the channels 4, 9, 10, 11 and 22 operationally connected thereto must be matched to one another. This applies, in particular, to leading the feed channel 4 over a middle member 25 into the separation chamber 23 already described. The interdependence between the middle member 25 projecting into the radial feed channel 4 and the axial feed channel 9, which branches off in this region, must be angled such that the dust particles 21 can be captured in the separation chamber 23. The drag forces of the flow in this separation chamber 23 are, however, still large enough that the finer dust particles, which cannot be captured, can be discharged from there via the emptying channel 22 in order then, as already described, to be led off via the radial or quasi-radial reverse flow channel 11. The separator 20 is installed in the rotor 1 such that it can be effectively accessed for servicing and cleaning the separation chamber 23, preferably in such a way that there is no need to open the machine for this purpose. A servicing-friendly design is to be seen in FIG. 2. The separation chamber 23 is sealed in the radial direction against the rotor outer surface 13 by a high-pressure seal 24 which, for its part, is tensioned by a multiply screwed closing cover 26. Should very fine particles pass to the moving blades via the axial feed channel 9, this is no longer bad, because the flow path of the cooling channels inside these blades is designed such that the remaining residual dust can be deflected at the tip of the blades and be transported back via the axial discharge channel 10.

Figure 3:
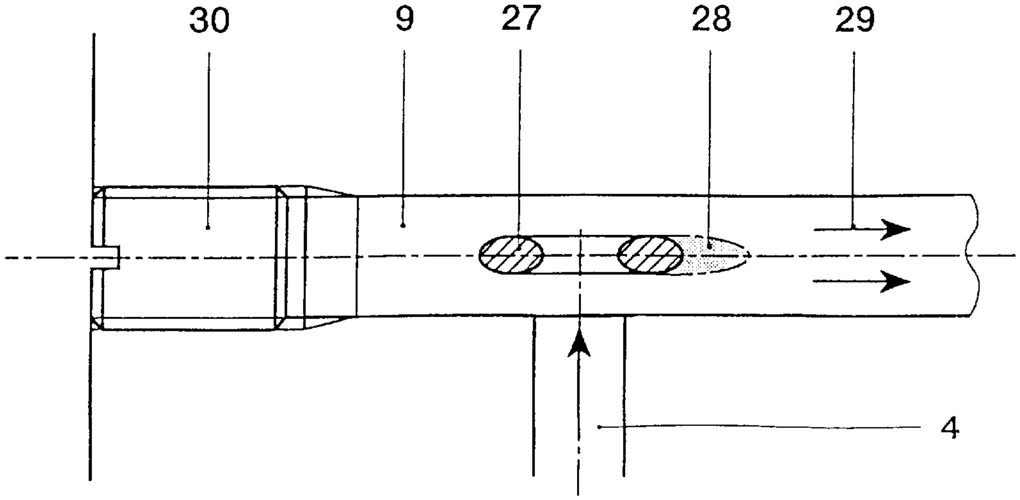

FIG. 3 shows the introduction of the radial feed channel 4 into the feed channel 9, extending in the axial direction, to the moving blades to be cooled. The tangential inflow, caused by the separation, of the first mentioned channel 4 into the second 9 produces in the region of the introduction a vortical flow which would be continued inside the feed channel 9 and would thus greatly impair the subsequent cooling of the moving blades. As a remedy against this, there are provided in this region ribs 27 and flow aids 28 which accomplish an eddy-free, specifically a laminar flow 29. The ribs 27 have a cutout, which is arranged essentially at right angles to the inflow from the feed channel 4 and which divides the flow and thus develops a smoothing effect. The flow aid 28 projecting into the feed channel 9 then further consolidates the laminar flow which has been formed. Such a flow then ensures efficient maximum cooling of the thermally loaded parts. These ribs 27 are produced by axially drilling the feed channel 9 at the end and then sealing it by means of a sealing pin 30.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for separating dust particles inside a cooling system of a rotor, fitted with moving blades, of a turbomachine, wherein the device is arranged upstream of the moving blades to be cooled, said device comprising:

at least one feed channel through which a coolant flows, the feed channel being directed in the radial direction inside the rotor such that dust particles located in the coolant accumulate on the side accelerating in the direction of rotation of the rotor, and a separation chamber operationally connected to the feed channel, dust particles being subsequently captured inside said device in said separation chamber.

2. The device as claimed in claim 1, wherein the device is arranged in the region of the rotor outer surface.

3. The device as claimed in claim 1, further comprising at least one emptying channel branching from the separation chamber, which opens into a reverse flow channel extending radially or quasi-radially in counterflow relative to the feed channel.

4. The device as claimed in claim 1, further comprising, downstream of the separation chamber, at least one axially or quasi-axially extending feed channel for supplying the moving blades with the coolant, said at least one axially or quasi-axially extending feed channel branching off from the feed channel.

5. The device as claimed in claim 4, wherein said axially or quasi-axially extending feed channel includes, in the flow plane of the feed channel, means for producing a laminar flow in said axially or quasi-axially extending feed channel.

6. The device as claimed in claim 1, wherein the separation chamber is accessible at least from a surface of the rotor.

* * * * *